United States Patent [19]

Maruyama et al.

[11] Patent Number: 5,498,050
[45] Date of Patent: Mar. 12, 1996

[54] STRUCTURE OF REAR WINDOW SHELF PORTION TO PARTITION VEHICULAR PASSENGER COMPARTMENT AND REAR TRUNK

[75] Inventors: Shinichi Maruyama; Akihiko Hasegawa, both of Yokosuka, Japan

[73] Assignee: Nissan Motor Co., Ltd., Yokohama, Japan

[21] Appl. No.: 359,138

[22] Filed: Dec. 19, 1994

[30] Foreign Application Priority Data

Dec. 27, 1993 [JP] Japan .................................... 5-330121

[51] Int. Cl.$^6$ .................................................. B60R 27/00
[52] U.S. Cl. ........................ 296/39.3; 296/37.16
[58] Field of Search .................. 296/37.16, 37.8, 296/195, 208, 39.1, 39.3

[56] References Cited

U.S. PATENT DOCUMENTS 5,076,631 12/1991 Lord, Jr. ............................... 296/37.8
5,171,054 12/1992 Wilson .................................. 296/37.16

FOREIGN PATENT DOCUMENTS 63-69652  5/1988  Japan .
5178142   7/1993  Japan .................................... 296/37.8
5170136   7/1993  Japan .................................... 296/37.16
1142624   2/1969  United Kingdom ................... 296/39.3
2276224   9/1994  United Kingdom .

Primary Examiner—Joseph D. Pape
Attorney, Agent, or Firm—Lowe, Price, LeBlanc & Becker

[57] ABSTRACT

A structure of a window shelf portion to partition a vehicular passenger compartment, comprising: a) a shelf panel mounted at the window shelf portion so as to partition the passenger compartment and a trunk, said trunk serving as a Helmholtz resonator chamber; b) a shelf trim mounted on the shelf panel with a space provided against the shelf panel; c) a plurality of openings formed on both of the shelf panel and the shelf trim so as to partially provide air passages between the trunk and passenger compartment and as to provide a throat portion of the Helmholtz resonator for the space; and d) at least one partition wall provided in the space between the shelf panel and shelf trim and arranged for reducing an equivalent cross sectional area of the throat portion of the Helmholtz resonator.

23 Claims, 8 Drawing Sheets

STRUCTURE OF REAR WINDOW SHELF PORTION TO PARTITION VEHICULAR PASSENGER COMPARTMENT AND REAR TRUNK

BACKGROUND OF THE INVENTION

1. Field of the Invention

The present invention relates to a structure of a rear window shelf portion of a vehicular body for partitioning a vehicular passenger compartment and a rear trunk in which a propagation of noise from the trunk to the passenger compartment can be prevented with a ventilating effect provided.

2. Description of Background Art

A Japanese Utility Model Registration First Publication No. show a 63-69652 published on May 11, 1988 exemplifies a previously proposed structure of a rear window shelf portion to partition the vehicular passenger compartment and rear trunk.

FIGS. 1 and 2 show another previously proposed structure of the rear window shelf portion generally similar to the disclosed structure of the rear window shelf portion in the above-identified Japanese Utility Model Registration Publication.

As shown in FIGS. 1 and 2, rear sound speakers 2 used for a vehicular audio system are mounted on a rear parcel (the term of the rear parcel is generally uncommon to United States of America and, hereinafter, referred to as a rear window shelf) panel 1 and ventilating openings 1a are formed at portions of the rear window shelf panel 1 which are located at rear ends thereof adjacent to a vehicular rear window (rear windshield). In addition, an opening 1b through which an operator accesses either a vehicular passenger compartment R or a rear trunk T in order to, for example, carry out electric wiring between the passenger compartment R and trunk T is formed at an intermediate portion of the rear shelf panel 1.

Furthermore, a rear shelf trim 4 is mounted on the rear window shelf panel 1 with a space provided against the rear shelf panel 1. Ventilating openings 4a whose position corresponds to the ventilating openings 1a of the rear window shelf panel 1, speaker openings 4b to radiate sounds derived from the speakers 2, and an opening 4c by which an air purifier (or air cleaner) is received are formed on the rear shelf trim 4. A plurality of felts 5a and 5b are attached on a rear side of the rear shelf trim 4 in order to improve a sound absorbing effect and a sound shielding effect.

In FIGS. 1 and 2, in addition to a ventilating path formed by the ventilating openings 1a of the rear window shelf panel 1 as a primary opening through which a ventilating air is passed to the trunk T and by the ventilating opening 4a of the rear shelf trim 4 as a secondary opening exposed to the passenger compartment R, other straight ventilating (air passages) paths formed by the ventilating openings 1a as the primary opening and by the speaker sound radiating openings 4b as the secondary opening are provided at the rear window shelf portion. Furthermore, still other ventilating paths (air passages) are formed between the opening 1b of the rear window shelf panel as the primary opening and the other openings 4b and 4c of the rear shelf trim 4 as the secondary opening. Hence, in the structure shown in FIGS. 1 and 2, an equivalent system to a Helmholtz resonator is established with the trunk T as a resonance chamber and the above-described paths and passages as a throat portion. Consequently, an equivalent cross sectional area of the throat portion is increased so that a resonance frequency of the resonator becomes high. Thus, the passenger compartment R is subject to receive a noise generated and propagated from the trunk T, particularly, low frequency components of the noise. Acoustic environment in the passenger compartment becomes unfavorable.

SUMMARY OF THE INVENTION:

It is an object of the present invention to provide a structure of a rear window shelf portion for partitioning a vehicular passenger compartment and a trunk which a noise propagation from the trunk to the passenger compartment is remarkably prevented without sacrifice of a ventilation function thereof so that the noise invaded from the trunk to the passenger compartment, particularly, low frequency components of the noise are suppressed to make vehicular occupant(s) comfortable.

The above-described object can be achieved by providing a structure of a rear window shelf portion arranged on a vehicular body, comprising: a) a rear window shelf panel formed on the vehicular body; b) a rear window shelf trim mounted on said rear window shelf panel with a space provided against said rear window shelf panel; c) primary openings formed on said rear window shelf panel and having a first ventilating opening and another opening; d) secondary openings formed on said rear window shelf trim and having a second ventilating opening faced against the first ventilating opening of said primary openings and another opening; and e) at least one partition wall installed in said space between said rear window shelf panel and said rear window shelf trim so as to partition said space between said rear window shelf panel and said rear window shelf trim into a primary space having both of the first and second ventilating openings and a secondary space having the openings of said primary and secondary openings other than both of the first and second ventilating openings.

The above-described object can be achieved by providing a structure of a rear window shelf portion arranged on a vehicular body, comprising: a) a rear window shelf panel formed on the vehicular body; b) a rear window shelf trim mounted on said rear window shelf panel with a space provided against said rear window shelf panel; c) primary openings formed on said rear shelf panel and having a second ventilating opening and a working-purpose opening; d) secondary openings formed on said rear window shelf trim and having a second ventilating opening faced against the first ventilating opening of said primary openings and another opening generally used to radiate a sound generated from a speaker of a vehicular audio system; e) a first partition wall installed in said space between said rear window shelf panel and rear window shelf trim so as to partition said space into a primary space having both of the first and second ventilating openings and another space having the openings of said primary and secondary openings other than both of the first and second ventilating openings; and f) a second partition wall installed in said other space between said rear window shelf panel and rear window shelf trim so as to partition said other space into another primary space having the working-purpose opening and a still another space having the other opening of the secondary openings used to radiate the sound generated from the speaker of the vehicular audio system.

The above-described object can be achieved by providing a structure of a window shelf portion to partition a vehicular passenger compartment, comprising: a) a shelf panel mounted at the window shelf portion so as to partition the passenger compartment and a trunk, said trunk serving as a Helmholtz resonator chamber; b) a shelf trim mounted on said shelf panel with a space provided against said shelf panel; c) a plurality of openings formed on both of said shelf panel and said shelf trim so as to partially provide air passages between the trunk and passenger compartment and as to provide a throat portion of the Helmholtz resonator for the space; and d) means, provided in said space between said shelf panel and shelf trim, for reducing an equivalent cross sectional area of the throat portion of the Helmholtz resonator.

BEST MODE CARRYING OUT THE INVENTION

Reference will hereinafter be made to the drawings in order to facilitate a better understanding of the present invention.

(First Embodiment)

FIGS. 3, 4A, 5, 6, and 7 show a first preferred embodiment of a structure of a rear window shelf portion partitioning a vehicular passenger compartment R and a rear trunk T according to the present invention.

Figure 3:
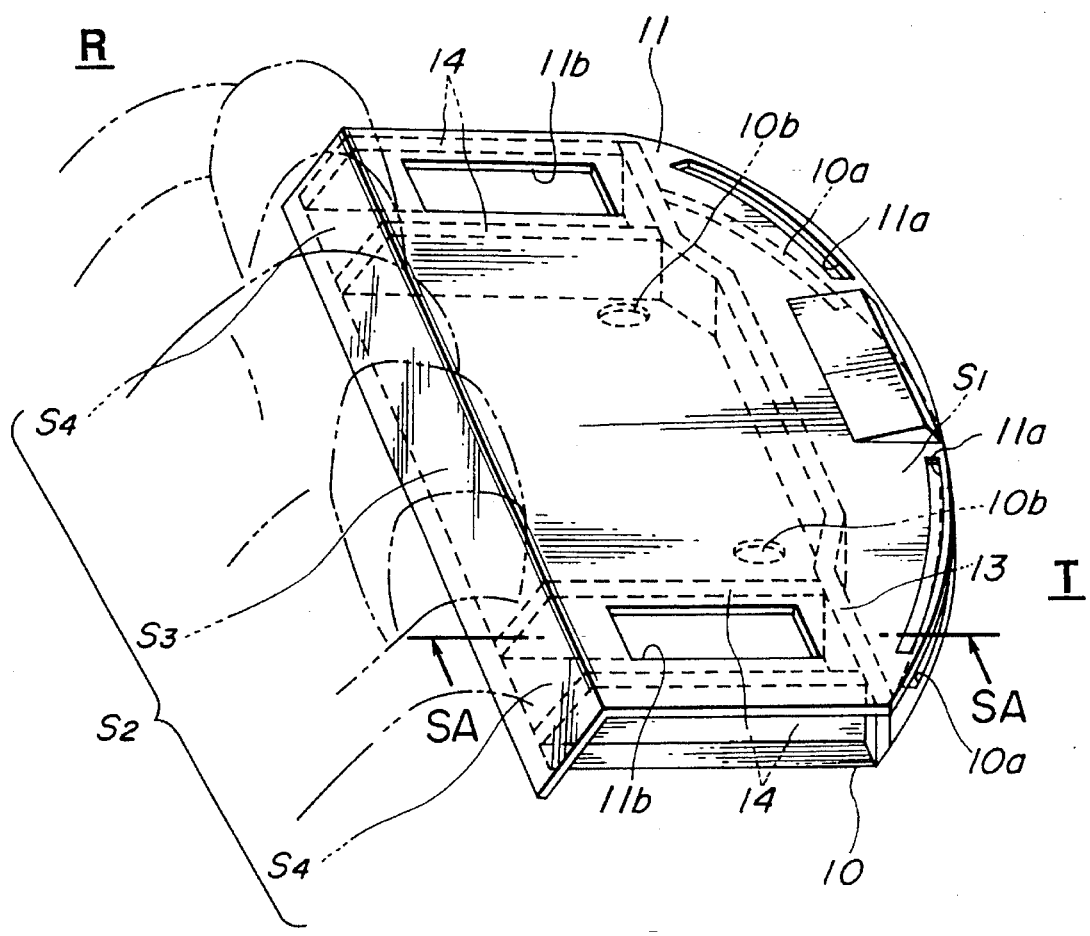
FIG. 3 is a perspective view of a rear window shelf portion in a first preferred embodiment according to the present invention.
Figure 4:
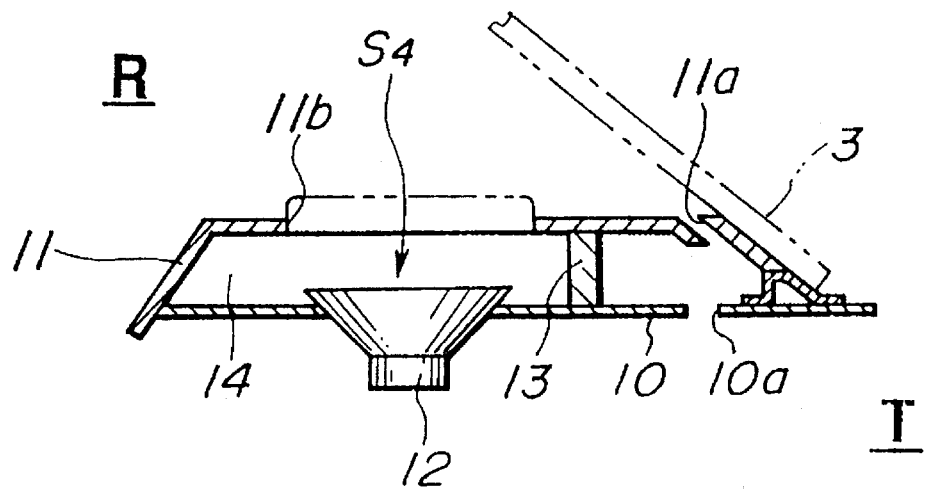
FIG. 4A is a cross sectional view of the rear window shelf portion cut away along a line SA—SA of FIG. 3.
FIG. 4B is a cross sectional view of the rear window self portion cut away along the line SA—SA of FIG. 3 as a modification of the first embodiment shown in FIG. 3.
Figure 4:
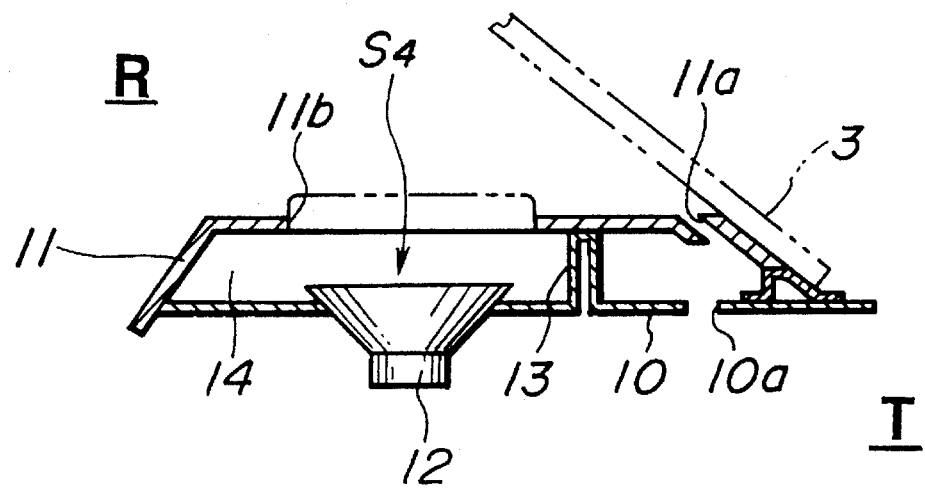

FIG. 3 shows a perspective view of the rear window shelf portion in the first embodiment. FIG. 4A shows a cross sectional view of the rear window shelf portion cut away along a line SB—SB of FIG. 3.

It is noted that, in FIG. 3, a rear windshield 3 (rear window), a side body panel, rear pillars, and other vehicle body panels are omitted for easy recognition of the rear window shelf portion of the vehicle.

It is also noted that a part of a rear seat back portion of the passenger compartment R denoted by a phantom line of FIG. 3 is to be contacted against a forward end of a rear window shelf trim 11 which will be described later.

Figure 1:
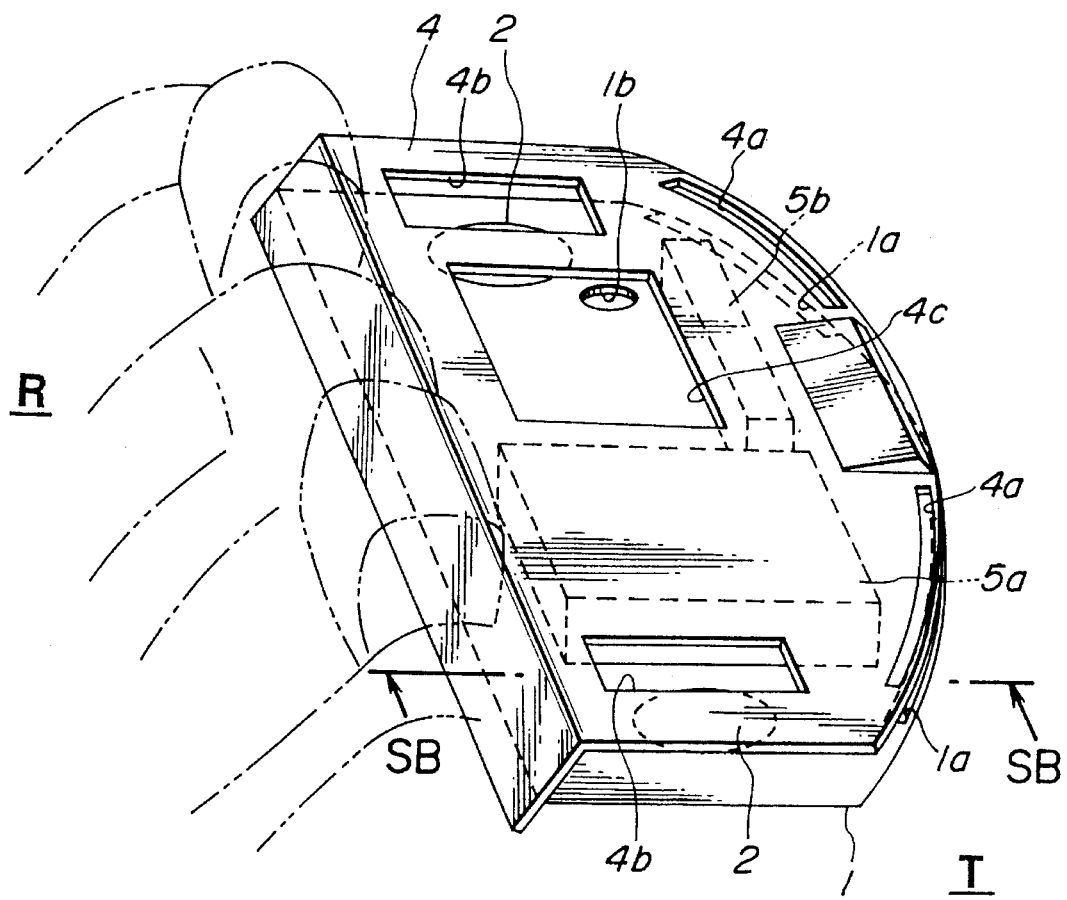
FIG. 1 is a perspective view of a rear window shelf portion of a previously proposed structure of a rear window shelf portion described in THE BACKGROUND OF THE INVENTION.
Figure 2:
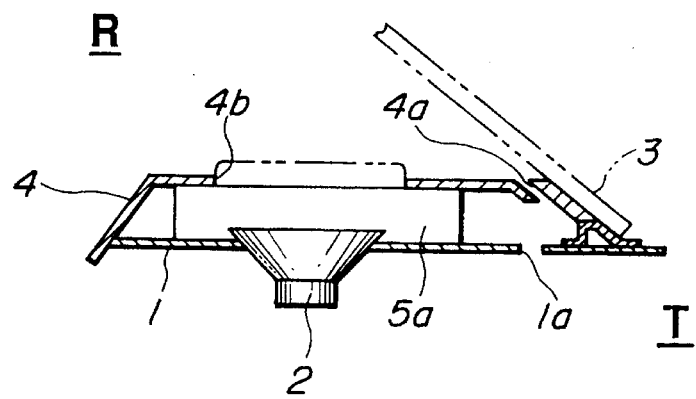
FIG. 2 is a cross sectional view of the rear window shelf portion cut away along a line SB—SB of FIG. 1.

As shown in FIGS. 3 and 4A, a pair of ventilating openings 10a as the primary opening through which the ventilating air is passed to the trunk T are formed on a rear end of a rear window shelf panel 10 located adjacent to a bottom side of a rear windshield 3. A pair of openings 10b used to access either the passenger compartment R or trunk T for the same purpose as the opening 1b of the rear shelf panel 1 shown in FIG. 1 are formed on the rear shelf panel 10 at intermediate ends thereof. The rear shelf trim 11 is attached on the rear window shelf panel 10 with a space provided against the rear window shelf panel 10. A pair of ventilating openings 11a are formed on the rear shelf trim 11 whose positions are faced against the corresponding ventilating openings 10a. Each ventilating opening 10a and 11a is formed generally in an arc shape and faced along the bottom end of the rear windshield 3.

In addition, each generally rectangular opening 11b used to radiate a sound generated from a rear speaker body 12 is formed on the rear shelf trim 11 as the secondary opening exposed to the vehicular passenger compartment R and is located at the position thereof corresponding to that of the speaker (body) 12.

Furthermore, a pair of partition walls 13, 14 are disposed in the space formed between the rear window shelf panel 10 and rear shelf trim 11 and each thereof is made of a non-breathable chip urethane block.

The one partition wall 13 is mounted in the space so as to interrupt the air passage connecting the ventilating opening 10a as the primary opening to the above-described speaker opening 11b as the secondary opening and so as to interrupt the air passage connecting between the working (circular) openings 10b (the pair of openings through which the operator accesses to either the passenger compartment R or the trunk T for the same purpose as the opening 1b shown in FIG. 1) as the primary opening and the ventilating opening 11a as the secondary opening. The partition wall 13 serves to divide the space between the rear window shelf panel 10 and the rear window shelf trim 11 into a first space $S_1$ having the ventilating openings 10a and 11a and serving as a primary space and a second space $S_2$ having the working openings 10b and the speaker openings 11b as the other openings and serving as a secondary space (or another space).

On the other hand, the other partition wall 14 is installed in the space so as to interrupt the air passage connecting between the working openings 10b and speaker openings 11b. The other partition wall 14 is extended at a left end and right end of each speaker opening 11b from the partition wall 13 to a forward end of the rear window shelf trim 11 so as to partition the second space $S_2$ as the other space into a third space. $S_3$ having the working openings 10b and serving as the primary space and a fourth space $S_4$ having the speaker openings 11b and serving as the secondary opening 11b.

In the first embodiment, each of both partition walls 13 and 14 is made of the chip urethane block having a light weight and a good workability and is previously attached onto a rear side of the rear shelf trim 11 so as to facilitate the mounting of the rear shelf trim 11 on the rear window shelf panel 10. It is noted that a sealing material (sealant) such as a silicone may be attached between both of the partition walls 13 and 14 and in order to improve an adhesive strength between the partition walls 13 and 14 and rear shelf panel 10 and the partition walls 13 and 14 are not necessary to be separate from each other but may be integrated.

Next, a noise suppression function in the first embodiment will be described.

As described in the BACKGROUND OF THE INVENTION, the resonance system of Helmholtz is established.

Figure 5:
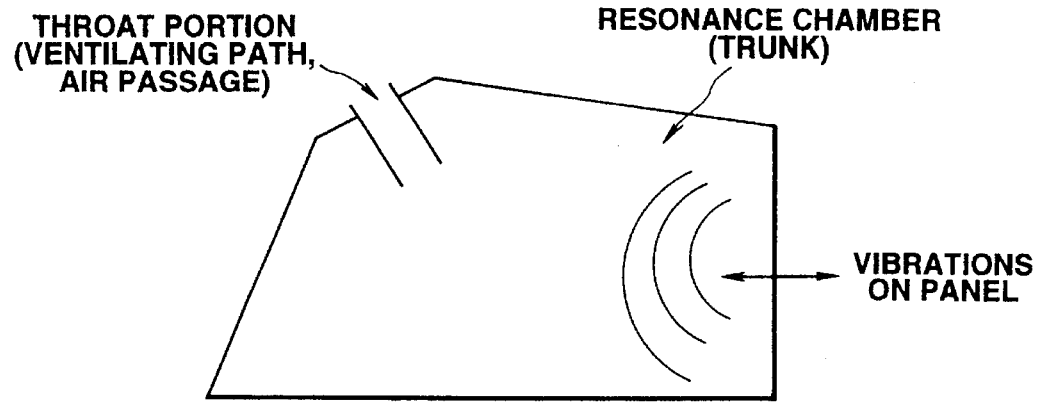
FIG. 5 is an explanatory view of a Helmholtz resonator in which a rear trunk serves as a resonance chamber and ventilating paths and air passages in the rear window shelf portion serves as a throat portion.

As shown in FIG. 5, low frequency components of the noise radiated due to vibrations on a panel constituting the trunk T are invaded into the vehicular passenger compartment R since the trunk T serves as the resonance chamber and the ventilating and air passages of the rear window shelf portion serve as the throat portion so that the Helmholtz resonator is established. A natural value (eigenvalue) of the resonance frequency of the Helmholtz resonator is proportional to an equivalent cross sectional area of the throat portion and is inversely proportional to a volume of the resonance chamber and equivalent length of the throat portion, as shown in FIG. 5.

Figure 6:
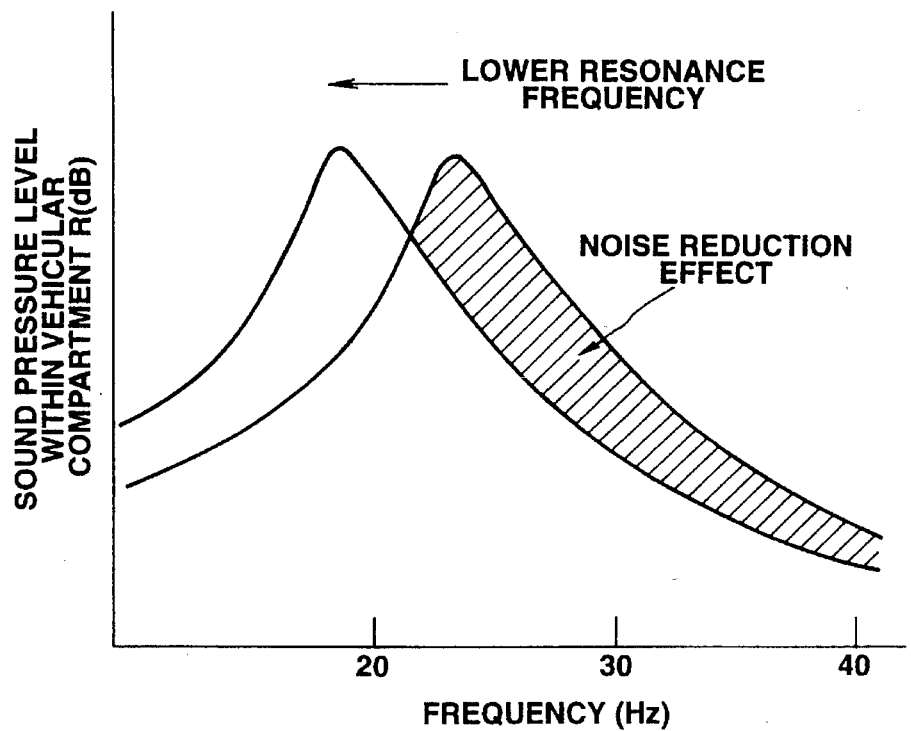
FIG. 6 is a characteristic graph representing an effect of noise reduction due to a reduction in a resonance frequency in the case of the first embodiment shown in FIG. 3.

The smaller the natural value of the Helmholtz resonator, the lower the resonance frequency becomes, in the case where the similar frequency characteristic are provided in the Helmholtz resonators. As shown in FIG. 6, a sound pressure level of the noise invaded into the vehicular compartment becomes reduced since the smaller natural value causes the lower resonance frequency.

That is to say, in the first preferred embodiment, each partition wall 13 and 14 is disposed so as to interrupt the ventilating path connecting between the ventilating opening 10a of the rear shelf panel 10 and the speaker opening 11b of the rear shelf trim 11 and so as to interrupt the ventilating path connecting between the working openings 10b of the rear shelf panel 10 and the speaker opening 11b of the rear shelf trim 11. Consequently, the resonance frequency is reduced by the equivalent cross sectional area of the throat portion and the noise invaded into the vehicular passenger compartment R is suppressed. Since the ventilating path connecting between the ventilating openings 10a of the rear window shelf panel 10 and ventilating openings 11a of the rear window shelf trim 11 is not interrupted and is left in the first space $S_1$, the ventilating function of the rear window panel is not sacrificed.

Figure 7:
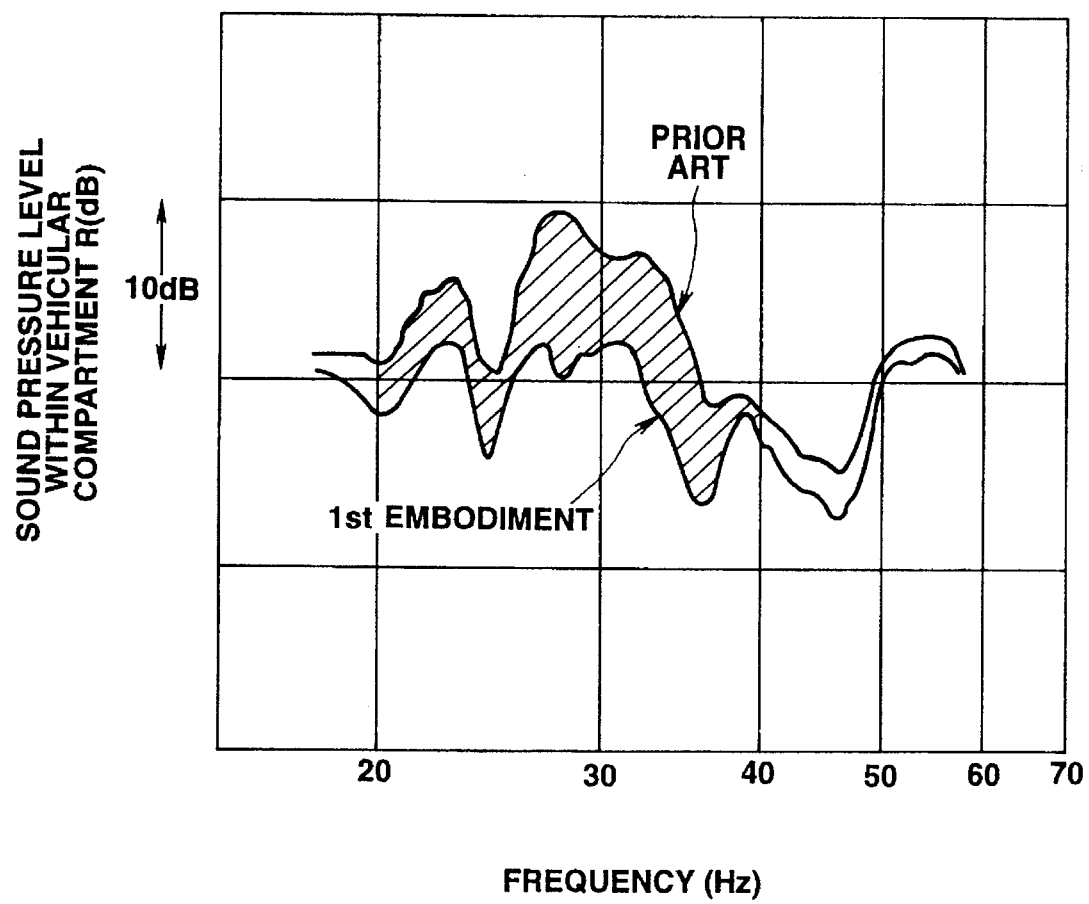
FIG. 7 is characteristic graphs representing noise propagation prevention effects on the vehicular passenger compartment between the previously proposed structure of the rear window shelf portion and that in the case of the present invention.

FIG. 7 shows the sound prevention effect of the first embodiment.

As appreciated from FIG. 7, a remarkable effect can be achieved in a low frequency region below 40 Hz.

FIG. 7 shows a sound pressure level of the vehicular passenger compartment when a vibration is applied onto a bolt used for mounting a rear suspension unit between a rear tire assembly and a rear bolt mounting portion of the vehicle body of a commercially available four-door sedan automotive vehicle.

As appreciated from FIG. 7, it was indicated that the remarkable effect in the frequency region equal to or lower than 40 Hz was obtained.

FIG. 4B shows a modification of the first embodiment.

As shown in FIG. 4B, the partition wall 13 is formed integrally of a part of the rear window self panel 10 by punching it to form the partition wall 13 as in the first embodiment. A head portion of the partition wall 13 formed by punching is in touch with the rear window shelf trim 11, as shown in FIG. 4B. It is of course that each of the partition walls other than the partition wall 13 (as will be described later) may be formed of the panel 10 by punching the rear window shelf panel 10 into the desired form.

(Second Embodiment)

Figure 8:
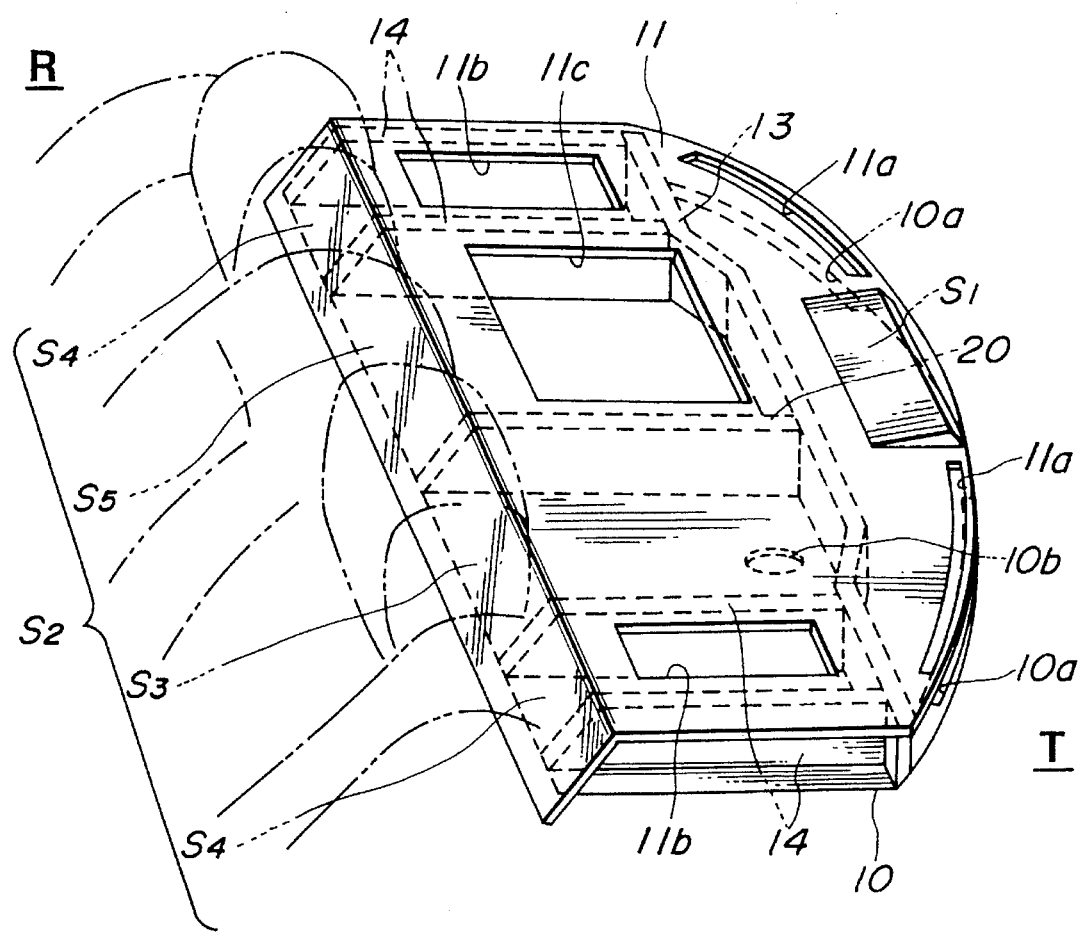
FIG. 8 is a perspective view of the rear window shelf portion in a second preferred embodiment according to the present invention.

FIG. 8 shows a second embodiment of the rear window shelf portion according to the present invention.

In the second embodiment, the air purifier is to be installed on the rear window shelf panel.

As shown in FIG. 8, a generally rectangular opening 11c is, furthermore, formed on the rear shelf trim 11 for receiving the air purifier body as the secondary opening. A still another partition wall 20 made of the chip urethane block is extended in the space so as to interrupt the ventilating path connecting between the air purifier opening 11c and the working opening 10b as the primary opening. A fifth space $S_5$ is, thereby, newly formed as the secondary space. Hence, the lower frequency components of the noise invaded from the trunk T to the passenger compartment R via the air purifier opening 11c can be suppressed.

(Third Embodiment)

Figure 9:
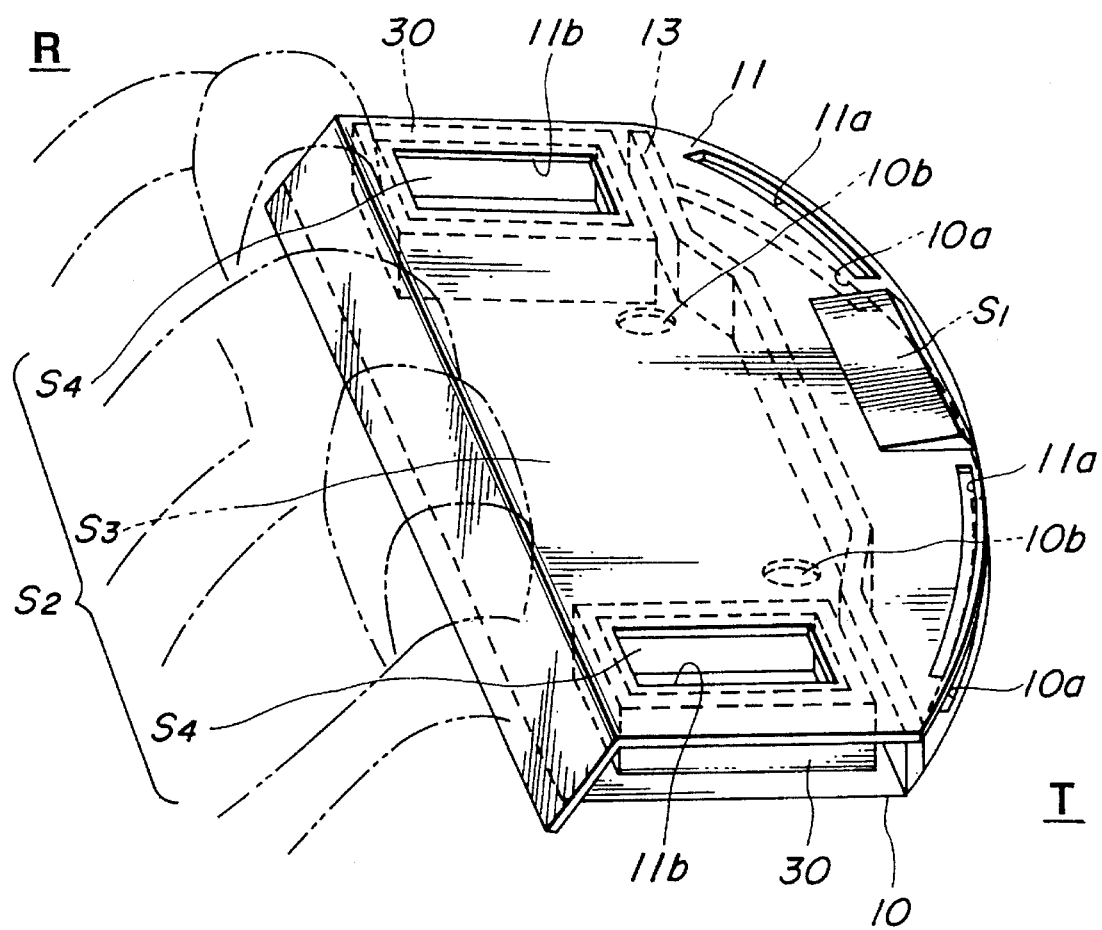
FIG. 9 is a perspective view of the rear window shelf portion in a third preferred embodiment according to the present invention.

FIG. 9 shows a third preferred embodiment of the vehicular rear window shelf portion according to the present invention.

Since the same partition wall 13 is installed, the space between the rear window shelf panel 10 and the rear shelf trim 11 is divided into the first space $S_1$ having the ventilating openings 10a and 11a and serving as the primary space and the second space $S_2$ as the other space. Together with the divided spaces, a still another partition wall 30 is installed in the space which is made of the chip urethane block. Each of the other partition walls 30 encloses the corresponding speaker opening 11b. In addition, the other partition wall 30 serves to divide the second space $S_2$ into the third space $S_3$ having the working opening 10b as the primary space and the fourth spaces $S_4$ each having the speaker opening 11b and serving as the secondary space.

The ventilating openings 10a and 11a are left in the first space $S_1$. Therefore, no sacrifice of the ventilating effect can be made and the suppression of noise from the trunk T to the vehicular passenger compartment can also be made. The positions of the respective other partition walls 30 cannot be limited by means of the working openings 10b. Furthermore, since an acoustic exclusive path from the speaker body 12 (refer to FIG. 4) to the corresponding speaker opening 11b is formed by means of each other partition wall 30, an acoustic effect can be improved.

(Fourth Embodiment)

Figure 10:
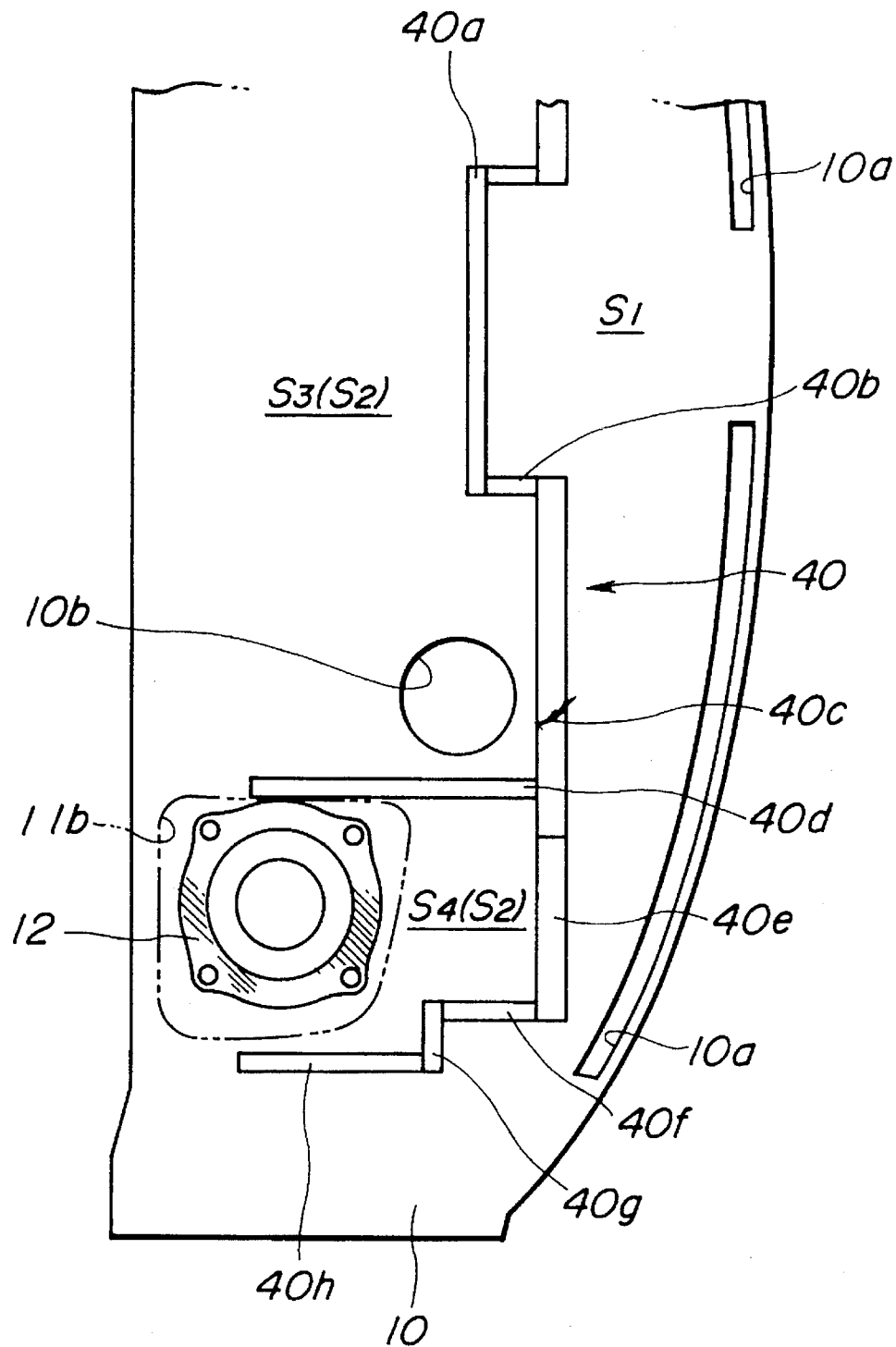
FIG. 10 is a top plan view of the rear window shelf portion in a fourth preferred embodiment according to the present invention.

FIG. 10 shows a fourth preferred embodiment of the rear window shelf portion according to the present invention.

FIG. 10 shows a top view of the rear window shelf panel and partition walls 40 with the rear shelf trim 11 omitted.

It is noted that a phantom line drawn around the one rear speaker 12 in FIG. 10 denotes the one speaker opening 11b formed on the rear window shelf trim 11 and FIG. 10 shows only a left side of the rear window shelf portion with respect to the rear side of the vehicle with the right side thereof omitted since the right side thereof has the same structure as the left side thereof.

As shown in FIG. 10, the partition wall 40 generally like the partition wall 13 in FIG. 8 is formed by an appropriate combination of a plurality of divided pieces 40a through 40h made of chip urethane blocks.

In the fourth embodiment, since various sizes of divided pieces 40a through 40h are used to form the partition wall 40, various shapes of the partition walls can easily be formed according to plane shapes of the rear window shelf panel 10 and of the rear window shelf trim 11.

Although the two divided pieces 40d and 40h do not extend up to the forward end of the rear shelf panel 11 so as to interrupt only the straight air passages between each opening. In this way, it is not necessary to perfectly shield each space of the first through fourth spaces $S_1$ through $S_4$ since if the straight air (ventilating) passages between the respective openings can be interrupted, the parts of the partition wall 40a, 40b, 40c, 40e, 40f, 40g have the function to elongate the equivalent length of the throat portion and to reduce the equivalent cross sectional area of the throat portion shown in FIG. 5. Therefore, the same effects as those in the first embodiment can be achieved in the fourth embodiment.

As described hereinabove, since, according to the present invention, the partition wall is formed to partition the space between the rear window shelf panel and rear window shelf trim into the space for the ventilating openings and the space for the other openings, the equivalent cross sectional area of the throat portion of the Helmholtz resonator becomes reduced and the resonance frequency is, thereby, reduced so that the sound pressure level of the noise to be propagated into the vehicular passenger compartment can be reduced without sacrifice of the ventilating function of the rear window shelf portion.

The invention should be understood to include all possible embodiments and modification to the shown embodiments which can be embodied without departing from the principle of the invention as set forth in the appended claims.

What is claimed is:

1. A structure of a rear window shelf portion arranged on a vehicular body, comprising:
    a) a rear window shelf panel formed on the vehicular body;
    b) a rear window shelf trim mounted on said rear window shelf panel with a space provided against said rear window shelf panel;
    c) primary openings formed on said rear window shelf panel and having a first ventilating opening and another opening;
    d) secondary openings formed on said rear window shelf trim and having a second ventilating opening faced against the first ventilating opening of said primary openings and another opening; and
    e) at least one partition wall installed in said space between said rear window shelf panel and said rear window shelf trim so as to partition said space between said rear window shelf panel and said rear window shelf trim into a primary space having both of the first and second ventilating openings and a secondary space having the openings of said primary and secondary openings other than both of the first and second ventilating openings.

2. A structure of a rear window shelf portion arranged on a vehicular body as claimed in claim 1, wherein said partition wall comprises a chip urethane block.

3. A structure of a rear window shelf portion arranged on a vehicular body as claimed in claim 1, wherein said partition wall is formed of a part of said rear window shelf panel.

4. A structure of a rear window shelf portion arranged on a vehicular body as claimed in claim wherein said partition wall is formed with a combination of a plurality of divided pieces of wall.

5. A structure of a rear window shelf portion arranged on a vehicular body as claimed in claim 1, wherein said partition wall serves to attenuate frequency components of noise propagated from said rear trunk whose frequencies are equal to or less than 40 Hz.

6. A structure of a rear window shelf portion arranged on a vehicular body, comprising:
    a) a rear window shelf panel formed on the vehicular body;
    b) a rear window shelf trim mounted on said rear window shelf panel with a space provided against said rear window shelf panel;
    c) primary openings formed on said rear shelf panel and having a second ventilating opening and a working-purpose opening;
    d) secondary openings formed on said rear window shelf trim and having a second ventilating opening faced against the first ventilating opening of said primary openings and another opening generally used to radiate a sound generated from a speaker of a vehicular audio system;
    e) a first partition wall installed in said space between said rear window shelf panel and rear window shelf trim so as to partition said space into a primary space having both of the first and second ventilating openings and another space having the openings of said primary and secondary openings other than both of the first and second ventilating openings; and
    f) a second partition wall installed in said other space between said rear window shelf panel and rear window shelf trim so as to partition said other space into another primary space having the working-purpose opening and a still another space having the other opening of the secondary openings used to radiate the sound generated from the speaker of the vehicular audio system.

7. A structure of a rear window shelf portion arranged on a vehicular body as claimed in claim 6, wherein each of said first and second partition walls comprises a chip urethane block.

8. A structure of a rear window shelf portion arranged on a vehicular body as claimed in claim 7, wherein said first and second partition walls are formed with a combination of divided pieces of wall.

9. A structure of a rear widow shelf portion arranged on a vehicular body as claimed in claim 8, wherein said first and second partition walls serve to attenuate frequency components of noise propagated from said rear trunk whose frequencies are equal to or less than 40 Hz.

10. A structure of a rear window shelf portion arranged on a vehicular body as claimed in claim 6, wherein at least said first partition wall is formed integrally of a part of said rear window shelf panel.

11. A structure of a window shelf portion to partition a vehicular passenger compartment, comprising:
    a) a shelf panel mounted at the window shelf portion so as to partition the passenger compartment and a trunk, said trunk serving as a Helmholtz resonator chamber;
    b) a shelf trim mounted on said shelf panel with a space provided against said shelf panel;
    c) a plurality of openings formed on both of said shelf panel and said shelf trim so as to partially provide air passages between the trunk and passenger compartment and as to provide a throat portion of the Helmholtz resonator for the space; and d) means, provided in said space between said shelf panel and shelf trim, for reducing an equivalent cross sectional area of the throat portion of the Helmholtz resonator.

12. A structure of a window shelf portion of a vehicular passenger compartment as claimed in claim 11, wherein said reducing means comprises a partition wall installed in said space to partition said space into a primary space and a secondary space, said primary space having a part of the plurality of openings used for ventilation purposes as first openings and said secondary space having the remaining part of the plurality of openings.

13. A structure of a window shelf portion of a vehicular passenger compartment as claimed in claim 12, wherein the remaining part of the plurality of openings includes second openings formed on said shelf panel through which either the passenger compartment or the trunk is accessed to carry out wirings and third openings formed on said shelf panel by which speaker bodies of a vehicular audio system are received.

14. A structure of a window shelf portion of a vehicular passenger compartment as claimed in claim 13, wherein said reducing means further comprises another partition wall installed in said space to partition said secondary space into a third space having the second openings and a fourth space having the third openings.

15. A structure of a window shelf portion of a vehicular passenger compartment as claimed in claim 14, wherein each of said partition wall and said other partition wall comprises a chip urethane block.

16. A structure of a window shelf portion of a vehicular passenger compartment as claimed in claim 15, wherein said partition wall and said other partition wall comprise a combination of a plurality of divided pieces of wall.

17. A structure of a window shelf portion of a vehicular passenger compartment as claimed in claim 16, wherein said partition wall serves to attenuate frequency components of noise propagated from the trunk into the passenger compartment which have frequencies equal to or less than 40 Hz.

18. A structure of a window shelf portion of a vehicular passenger compartment as claimed in claim 17, wherein said first openings are formed on parts of said shelf panel and of said shelf trim which are located along an inner bottom part of a rear windshield of the vehicle mutually in general arc shapes.

19. A structure of a window shelf portion of a vehicular passenger compartment as claimed in claim 18, wherein said partition wall is extended along said first openings from a first end of the space between said shelf panel and said shelf trim to a second end therebetween in a direction corresponding to a vehicular width direction.

20. A structure of a window shelf portion of a vehicular passenger compartment as claimed in claim 19, wherein said shelf trim includes fourth openings used for radiating sounds from the speaker bodies which are extended from intermediate ends of said partition wall to intermediate ends of said shelf trim facing toward the passenger compartment in a direction corresponding to a vehicular forward direction.

21. A structure of a window shelf portion of a vehicular passenger compartment as claimed in claim 20, wherein a fifth opening is formed on said shelf trim so as to receive an air purifier body, said third opening is located in the secondary space, and one of said second openings through which either the passenger compartment or trunk is accessed to carry out the wirings is partitioned by a still another partition wall extended in said space.

22. A structure of a window shelf portion of a vehicular passenger compartment as claimed in claim 18, wherein said other partition wall comprises two separate walls, each of which entirely encloses each of the third and fourth openings.

23. A structure of a window shelf portion of a vehicular passenger compartment as claimed in claim 12, wherein said partition wall is formed integrally of a part of the rear window shelf panel by punching said part of said rear window shelf panel so that a head of said partition wall is in touch with the rear window shelf trim.

\* \* \* \* \*